Aug. 7, 1962     T. S. RICHARDS ETAL     3,048,035
METHOD AND APPARATUS FOR METERING WET GAS
Filed Dec. 31, 1958
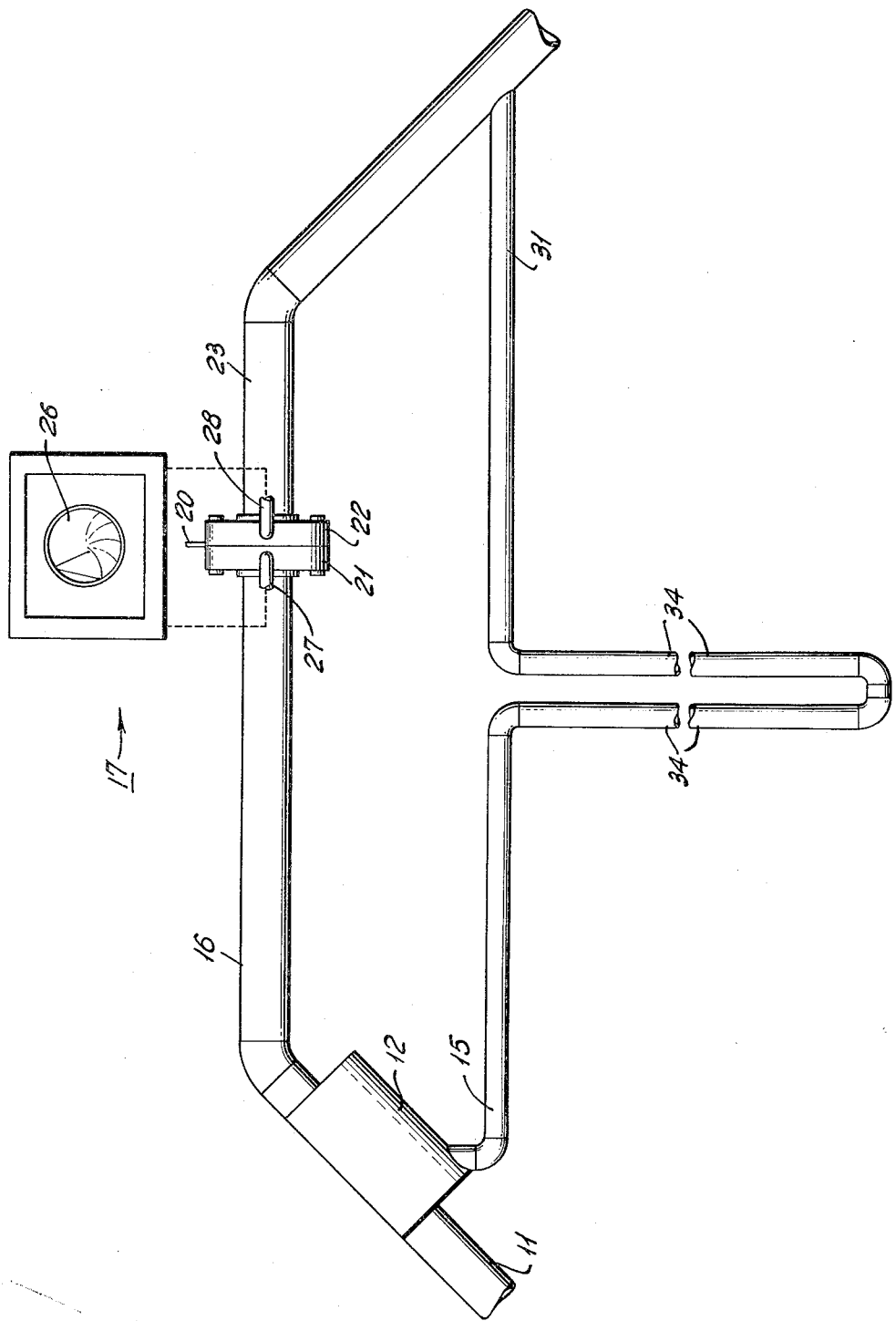

United States Patent Office 3,048,035
Patented Aug. 7, 1962

3,048,035
METHOD AND APPARATUS FOR METERING WET GAS
Thomas S. Richards and Forrest C. Howard, El Campo, Tex., assignors to Texaco Inc., a corporation of Delaware
Filed Dec. 31, 1958, Ser. No. 784,108
3 Claims. (Cl. 73—200)

This invention is concerned with metering wet gases, in general. More specifically, it is concerned with a superior method and apparatus for metering the flow of wet gas, while avoiding the problems of erosion caused by the liquids that are entrained therein.

Heretofore the metering of gas containing liquids has provided a problem that is particularly common in oil well production wherein gas wells are involved, or high ratio oil wells. In either of these situations it is important to meter, i.e. measure, the quantity of flow of the gas; and at the same time the metering of such gas flow presents a real problem where there is considerable liquid entrained with the gas. No matter what type of meter is employed for measuring the flow of gas, the presence of liquid causes excessive wear on the meter and hence soon renders the meter indications inaccurate. This is particularly true with the commonly used standard orifice type meter.

Consequently, it is an object of this invention to provide a method for measuring the flow of a gas which contains liquid entrained therein, without encountering the deleterious effects of the liquid in the gas.

Another object of the invention is to provide apparatus that is simple in construction, sure in its operation, and which allows the separation of liquid from a wet gas followed by the metering of the flow of the dry gas and then a recombining of the liquid with the gas to pass on the original wet gas after metering.

Briefly, the invention concerns a method of metering gas containing a liquid. In such a method the invention concerns the improvement that comprises the steps of reducing the velocity of flow of said gas to separate out said liquid, and draining off said separated liquid into a liquid filled trap. Also, it comprises the steps of metering the flow of said dry gas, and maintaining a liquid level differential in said trap in excess of the pressure drop across said dry gas meter. Finally, it comprises the step of recombining said liquid with said gas after metering to restore the original properties thereof.

Also and again briefly, the invention concerns apparatus for metering a gas containing a liquid therein. The apparatus comprises means for separating said liquid from said gas having an outlet for the dry gas, and means for draining said separated liquid off from said separating means. The apparatus also comprises trap means for maintaining a liquid seal to force said dry gas to all flow through said outlet, and meter means connected to said outlet for metering the flow of said dry gas. In addition, the apparatus comprises means for connecting said trap means to said gas flow on the down stream side of said meter means to allow recombination of the liquid with the gas.

The foregoing objects and advantages of the invention will be more fully appreciated in connection with a detailed illustration of the invention which follows. This specific illustration of the invention is illustrated in the drawings, in which the figure illustrates schematically the elements of the system that are employed, and that may be used to carry out the method of the invention.

Referring to the figure of the drawing, it is pointed out that there is a conduit 11 that is carrying the wet gas, or highly gaseous petroleum liquid, therein. The conduit 11 is connected to a separation chamber 12 that has an internal cross section area which is considerably greater than the cross section area of the conduit 11. For this reason the velocity of flow of the gas and liquid entrained therein, is greatly reduced in the separation chamber 12; and the liquid separates out at this point.

It is pointed out that the separation chamber 12 might take other forms for accomplishing the same purpose, i.e. the separator employed at this point in the system might be one employing baffles or the like, for making the liquid component separate from the gas.

Connected to a low point of separator 12 there is a drain passage 15 for carrying off the accumulated liquid from the separation chamber 12.

There is another conduit 16 that is connected to the other end of the separation chamber 12, for carrying the dry gas out from the chamber. Conduit 16 is connected to a gas meter 17 that may take any desired form. In the illustrated system, meter 17 is a standard American Gas Association meter that has an orifice plate 20 which is clamped between a pair of flanges 21 and 22, that are carried on the end of the conduit 16 and another conduit 23, respectively. The gas flow through the orifice (that is centrally located in orifice plate 20) is measured continuously by means of the illustrated recording meter 26, that records the differential in the static pressures existing on each side of the orifice plate 20. These static pressures are determined via a pair of small diameter pipes 27 and 28 which are connected to radial passageways (not shown) through the flanges 21 and 22 respectively. The dry gas then continues to flow via conduit 23 to the point where a pipe 31 joins the conduit 23. At this location the dry gas again picks up liquid from the pipe 31, and thus resumes its former wet state.

It is pointed out that the orifice plate 20 is only visible by the handle thereof which extends radially out from between the flanges 21 and 22. However, since plate 20 is a standard item of known equipment no further illustration is deemed necessary. The plate is merely a flat disc with a centrally located, exact sized, orifice therethrough.

Connected between the drain passage 15 and the pipe 31 there is a U-tube 34. U-tube 34 is filled with the same liquid that is entrained in the wet gas being metered. The height of this liquid column is at least sufficient to maintain a gas seal that will force all of the gas to flow up via the conduit 16, to be passed through the meter 17 for measurement thereof. Thus, it will be clear that the vertical height of the U-tube 34 (from the bottom of the U bend to the top of the legs) must be sufficient so that the maximum difference in liquid level in the two legs of the U-tube will provide hydraulic head or pressure differential that is at least equal to or greater than the maximum difference of pressure that may exist across the meter 17. In other words, the height of the U-tube 34 in inches, should be at least equal to the meter range in inches of water, divided by the specific gravity of the liquid that is entrained with the gas (since specific gravity is based on water as unity).

It will be appreciated that other types of trap structures could be employed in place of the U-tube 34, so long as the structure is such that the required difference in pressure could be maintained, so as to avoid the allowing of any gas to bypass the meter 17.

The steps of the method of metering gas that contains a liquid, may be briefly stated as follows: (1) The liquid is separated from the gas. This may be carried out by the illustrated equipment that provides a separation chamber; or it may be carried out with various other types of equipment, e.g. a baffle structure for separating the liquid from the gas. (2) The liquid that is separated from the gas is drained into a liquid filled trap. This may be carried out with any convenient structure, e.g. the drain pipe 15 and the U-tube 34 illustrated. (3) The flow of dry gas is metered to determine how much gas is flowing through the line. This may be carried out by using any feasible type of gas meter, that can measure the flow of the dry gas. (4) The liquid level in the trap is maintained in excess of that necessary to overcome the pressure drop across the meter. This is carried out by making sure that the trap structure has a sufficient height for the liquid column therein to provide for a static head difference of the liquid that is at least equal to or greater than the maximum pressure drop across the meter. In this way the trap always provides a block to the passage of any of the gas, and forces all of the gas to flow through the meter. (5) The liquid is then recombined with the dry gas to restore the liquid and gas to their former relationship. This is carried out by merely connecting the down stream side of the conduit which carried the dry gas, with the trap; and thus allowing excess liquid to flow into, and be picked up by, the gas at this point.

While a particular embodiment of the invention has been described above in some detail, in accordance with the applicable statutes, this is not to be taken as in any way limiting the invention but merely as being descriptive thereof.

What is claimed as the invention is:

1. Apparatus for metering a gas containing a liquid therein, comprising means for reducing the velocity of flow of said gas to separate out said liquid having an outlet for the dry gas, means for draining said separated liquid off from said velocity reducing means, U-tube means for maintaining a liquid seal to force said dry gas to all flow through said outlet, meter means connected to said outlet for metering the flow of said dry gas, and means for connecting said U-tube means to said outlet on the down stream side of said meter means to allow recombination of the liquid with the gas.

2. Apparatus for metering a gas containing a liquid therein, comprising means for reducing the velocity of flow of said gas to separate out said liquid having an outlet for the dry gas, means for draining said separated liquid off from said velocity reducing means, liquid filled U-tube means connected to said draining means and having sufficient vertical dimensions to provide a liquid level differential of a magnitude great enough to maintain a gas seal forcing all the gas to flow through said outlet, meter means connected to said outlet for metering the flow of said dry gas, and means for connecting said U-tube means to said outlet on the down stream side of said meter means to allow recombination of the liquid with the gas.

3. Apparatus for metering a gas containing a liquid therein, comprising a first conduit, a separation chamber having an effective cross section area greater than that of said conduit, a liquid drain passage connected to said chamber for draining accumulated liquid, a liquid filled U-tube connected to said drain passage, a second conduit connected to said separation chamber for carrying dry gas away, meter means connected to said second conduit for measuring the flow of dry gas, a third conduit connected to the down stream side of said meter means, and means for connecting the other side of said U-tube to said third conduit for recombining said liquid with said dry gas.

References Cited in the file of this patent

UNITED STATES PATENTS

| | | |
|---|---|---|
| 2,097,829 | Bassler | Nov. 2, 1937 |
| 2,105,262 | Price | Jan. 11, 1938 |
| 2,306,606 | Hirsch | Dec. 29, 1942 |
| 2,648,225 | Hemmens | Aug. 11, 1953 |